United States Patent [19]
Yang

[11] Patent Number: 5,894,177
[45] Date of Patent: Apr. 13, 1999

[54] SEGMENTED ARMATURE WINDING FOR A DC MOTOR

[76] Inventor: Tai-Her Yang, 5-1 Taipin St., Si-Hu Town, Dzan-Hwa, Taiwan

[21] Appl. No.: 08/818,893

[22] Filed: Mar. 17, 1997

Related U.S. Application Data

[63] Continuation of application No. 08/268,283, Jun. 30, 1994, abandoned, which is a continuation-in-part of application No. 07/939,984, Sep. 3, 1992, abandoned, which is a continuation-in-part of application No. 07/599,741, Oct. 19, 1990, abandoned.

[51] Int. Cl.$^6$ .................................................. H02K 41/035
[52] U.S. Cl. ........................... 310/12; 310/201; 310/234; 318/135
[58] Field of Search ................... 318/135; 310/12, 310/13, 15, 17, 46, 80, 133, 136–140, 148, 149, 154, 156; 45/177, 206, 207, 201, 202, 203, 198, 233, 234, 248, 249, 261

[56] References Cited

U.S. PATENT DOCUMENTS

| | | | |
|---|---|---|---|
| 3,436,573 | 4/1969 | Persson | 310/113 |
| 4,187,453 | 2/1980 | Kirkwood | 310/13 |
| 5,080,627 | 1/1992 | Oriya et al. | 310/12 |
| 5,198,740 | 3/1993 | Jacobsen et al. | 318/135 |

FOREIGN PATENT DOCUMENTS

| | | | |
|---|---|---|---|
| 0230823 | 2/1960 | Australia | 310/13 |
| 0210867 | 9/1986 | Japan | 310/12 |
| 0002848 | 1/1987 | Japan | 310/12 |
| 0095868 | 4/1988 | Japan | 310/12 |

*Primary Examiner*—Thomas M. Dougherty
*Attorney, Agent, or Firm*—Bacon & Thomas, PLLC

[57] ABSTRACT

A DC machine having a primary and a secondary for generating electromagnetic movement of the secondary. The primary incorporates a plurality of parallel conductive segments arranged side-by-side along the direction of secondary movement. As the secondary moves with respect to the primary, commutating strips mounted on the secondary commutate the conductive segments of the primary according to a sequence in which successive groups of the conductive segments are interconnected to form series or parallel excitation windings. The succession of excitation windings serves to induce continuous electromotive force between the secondary. The arrangement is especially suited for a linear motor having non-returning armature windings, but may be in rotary machines as well.

15 Claims, 7 Drawing Sheets

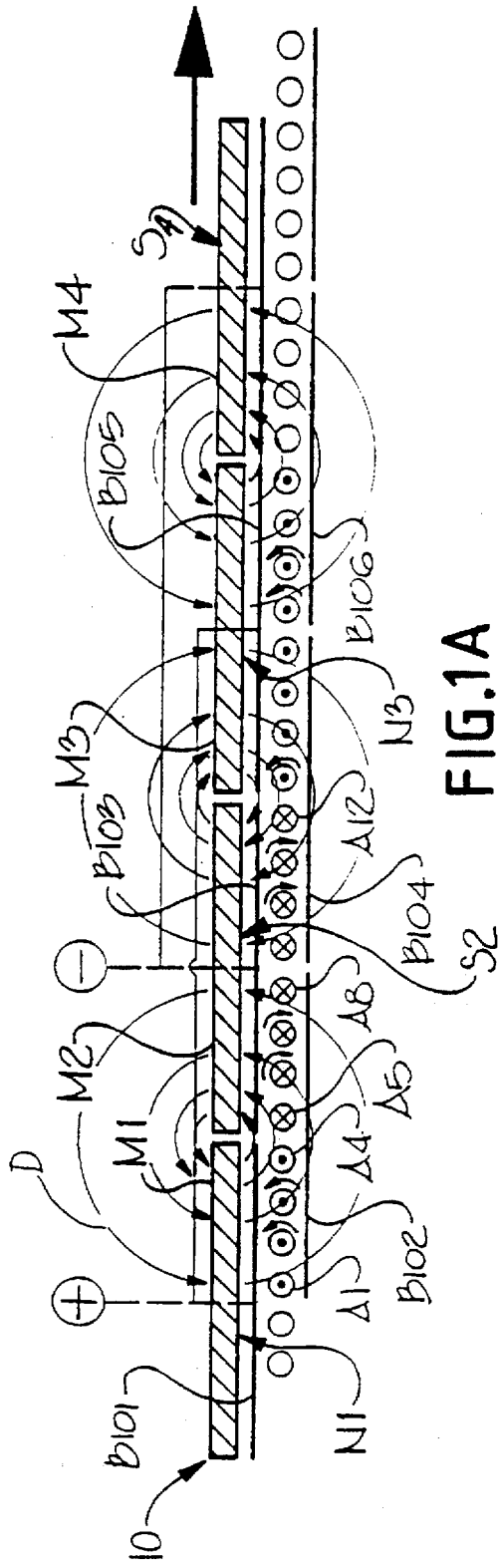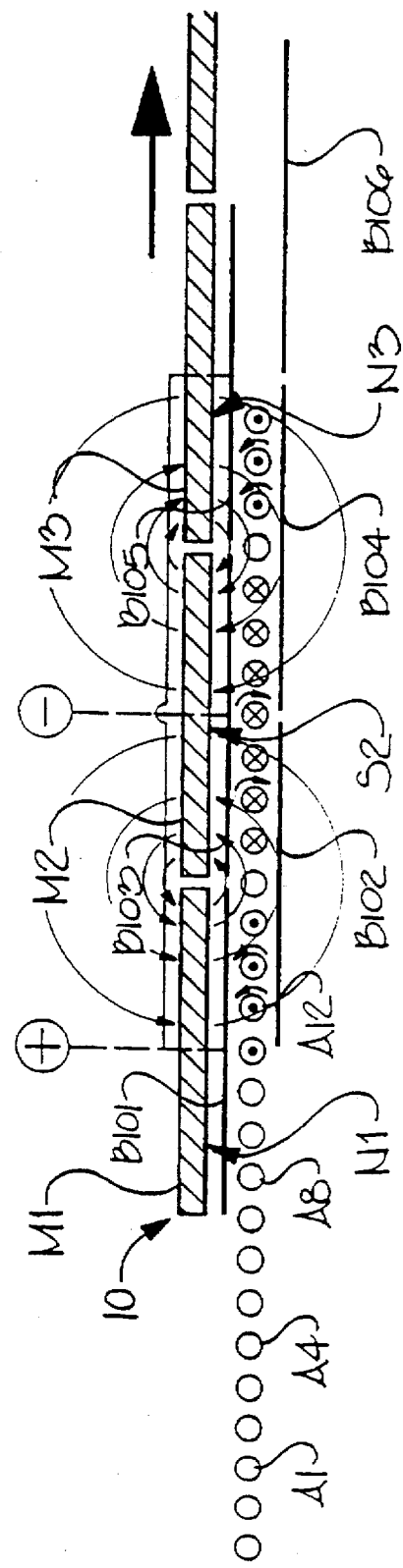

SEGMENTED ARMATURE WINDING FOR A DC MOTOR

CROSS-REFERENCE TO RELATED APPLICATION

This application is a Continuation of application Ser. No. 08/268,283, filed Jun. 30, 1994, now abandoned, which is a continuation-in-part of application Ser. No. 07/939,984 filed Sep. 3, 1992, now abandoned, which, in turn, is a continuation-in-part of application Ser. No. 07/599,741 filed Oct. 19, 1990, now abandoned, the disclosures of which are incorporated herein in their entirety.

BACKGROUND OF THE INVENTION

1. Field of the Invention

The present invention relates to DC machines, and more particularly, to a DC machine having a primary (or stator) of infinitely extendable length (or circumference), and even more particularly, to a DC machine wherein a primary (or stator) is furnished with conductive segments forming non-closed loop excitation coils, each coil having two spaced-apart ends.

2. Description of the Background

The armatures of traditional DC machines are generally furnished with either lap windings or wave windings. No matter which one of these two types of windings are furnished, the ending lead will return to the starting lead to form a closed loop. This constraint renders it impractical to use these traditional windings in certain situations. For example, lap windings or wave windings are impractical in linear motors because the coils begin and end at remote positions along an elongate primary core. Hence, it would be awkward to bring the ending lead back to the starting lead in order to form a closed loop.

SUMMARY OF THE INVENTION

Accordingly, it is an object of the present invention to provide a DC machine having a primary (or stator) incorporating a plurality of discrete conductive segments arranged side-by-side in an extendable series of infinite length, and a secondary (or rotor) which commutates successive groups of the primary conductive segments together as it moves relative thereto, the groups of conductive primary segments being connected to form series or parallel excitation coils for inducing continuous movement of the secondary.

It is another object of the present invention to provide a primary for a DC machine as described above which can be easily extended to any length, and is thereby especially suited for use in linear DC machines.

In accordance with the above-described and other objects, the present invention is a DC motor which comprises a secondary generating a series of magnetic poles of alternating polarities, and a primary in a facing relation with the secondary for inducing electromagnetic movement of the secondary. The primary further includes a plurality of conductive segments having two ends, the conductive segments being arranged side-by-side and orthogonally with respect to the magnetic poles of the secondary. A commutator is also provided, the commutator including a plurality of commutating strips mounted on the secondary and moveable therewith to maintain conductive contact with the conductive segments of the primary. The commutating strips serve the purpose of conventional brushes, and are arranged in two groups, including a first group of commutating strips aligned with one end the conductive segments for making conductive contact therewith, and a second group of commutating strips aligned with the other ends of the conductive segments for making conductive contact therewith. The commutating strips of the first group each connect a cluster of the conductive segments at the one end while the commutating strips of the second group each connect a cluster of the conductive segments at the other end. The commutating strips are further arranged to contact overlapping clusters, such that an electrical path is provided through the conductive segments from a commutating strip of the first group to the commutating strip of the second group and back to another commutating strip of the first group. This way, the conductive segments serve as excitation coils when power is applied across commutating strips of the first group to induce movement of the secondary. As the secondary continues to move along the primary, successive conductive segments come into contact with each commutating strip while departing conductive segments lose contact, but the electrical excitation path is always maintained through successive conductive segments, and continuous movement of the secondary along the primary may be maintained.

BRIEF DESCRIPTION OF THE DRAWINGS

Other objects, features and advantages of the present invention will become more apparent from the following detailed description of preferred embodiments and certain modifications thereof when taken together with the accompanying drawings, in which:

FIG. 1A is a cross-sectional view of FIG. 1, taken along lines X—X, schematically illustrating magnetic flux path.

FIG. 1B is a cross-sectional view of FIG. 1, taken along lines Y—Y, schematically illustrating magnetic flux path.

DETAILED DESCRIPTION OF THE PRESENT INVENTION

The present invention is a DC machine having primary (a.k.a. a stator in the case of a rotary embodiment) which, instead of the conventional lap-windings or wave-windings, incorporates a series of conductive segments arranged side-by-side in a series. The conductive segments, being connected, form non-closed loop current conducting armature windings each having a pair of spaced-apart ends. The invention also includes a secondary (a.k.a. a rotor in the case of a rotary embodiment) which moves relative to the primary as the result of electromagnetic excitement. The secondary is defined by a series of magnetic poles directed orthogonally with respect to the conductive segments of the primary, the poles being arranged in alternating polarities. A commutator is also provided, the commutator including commutating strips mounted on the secondary for connecting the ends of the conductive segments together to form series or parallel excitation coils capable of inducing an electromagnetic reaction between the primary and the secondary. The commutating strips serve the purpose of conventional brushes and are fixed on both sides of the secondary and move therewith to connect the ends of the conductive segments together to form circuitous electrical paths which serve as excitation coils. An excitation current supplied to the commutating strips from an input source travels the circuitous path, thereby generating an inductive reactance which forms a magnetic coupling with the poles of the secondary to thereby drive the secondary. As the secondary moves, successive conductive segments come into contact with each commutating strip while departing conductive segments lose contact, but an advancing circuitous electrical excitation path is always maintained through successive conductive segments to continuously drive the secondary along the primary.

Figures 1, 2:
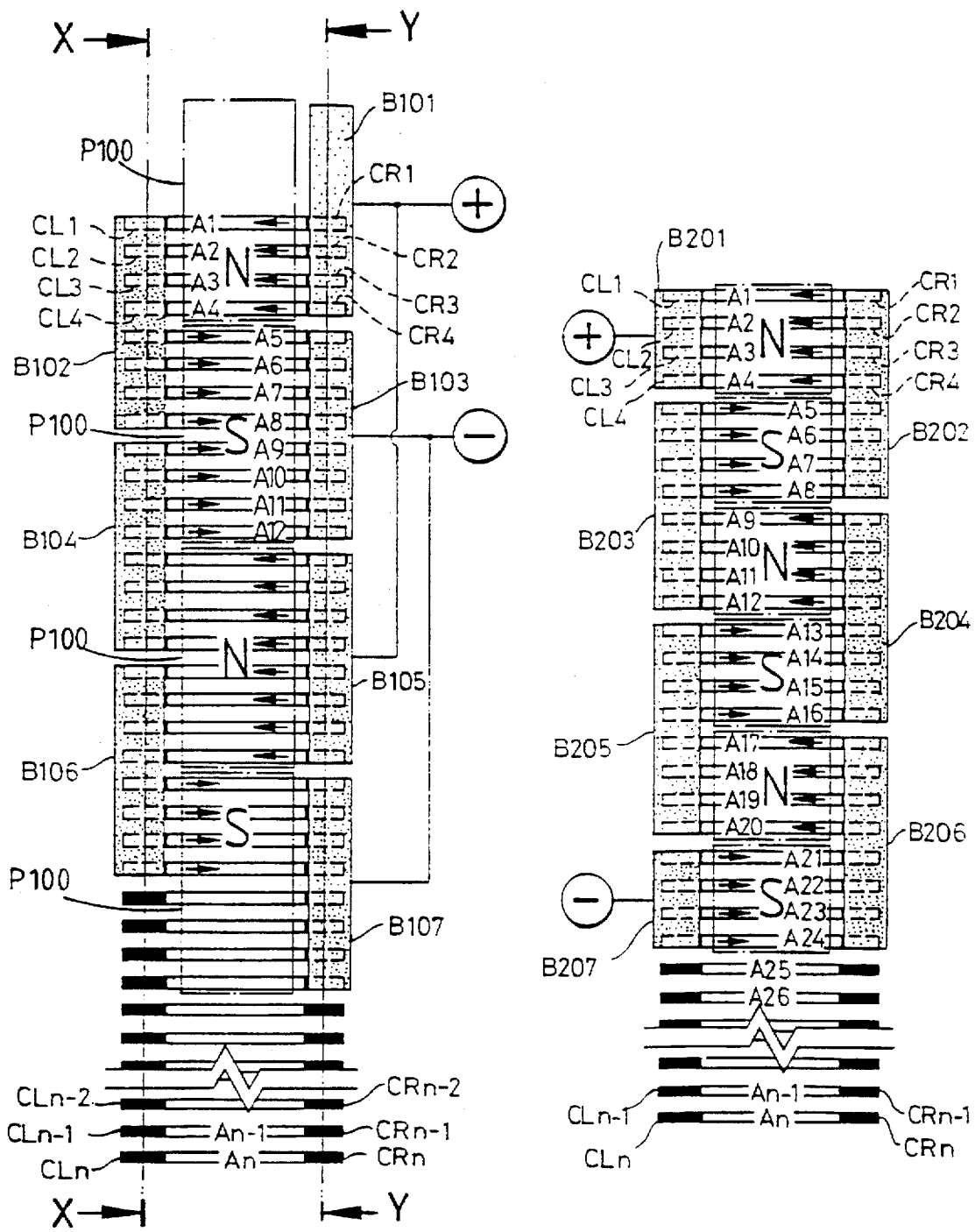
FIG. 1 illustrates a parallel-connected embodiment of the present invention.
FIG. 2 illustrates an alternative series-connected embodiment of the present invention.
Figure 3A:
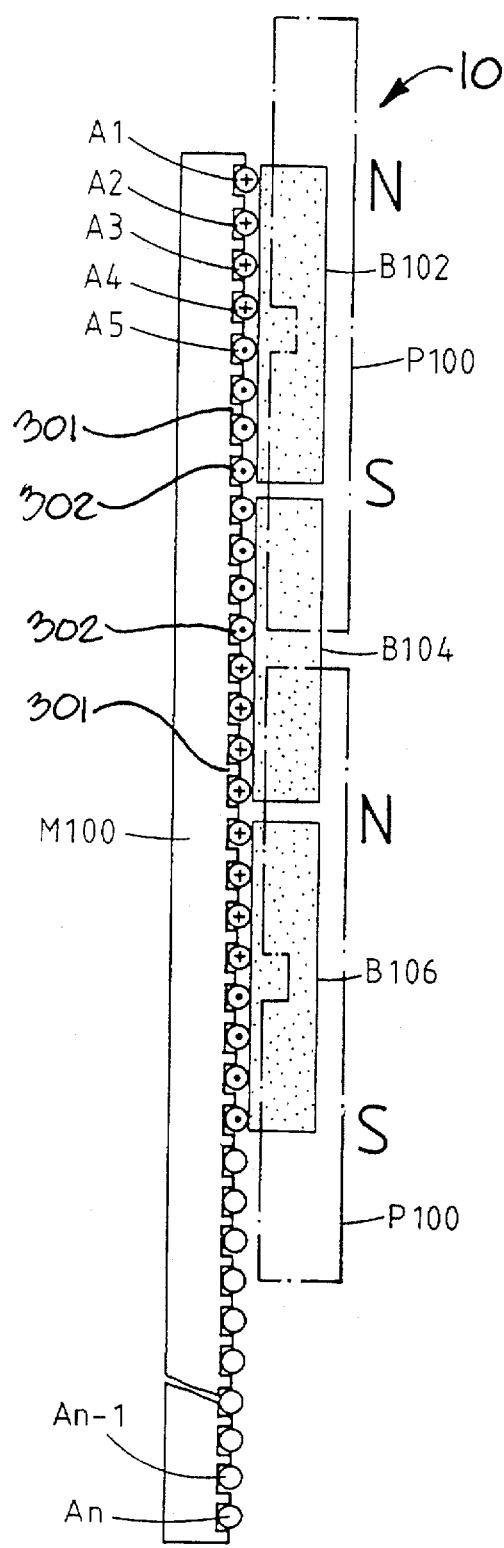
FIG. 3A is a cross-sectional view of FIG. 1, taken along lines X—X, illustrating a primary core.
Figure 3B:
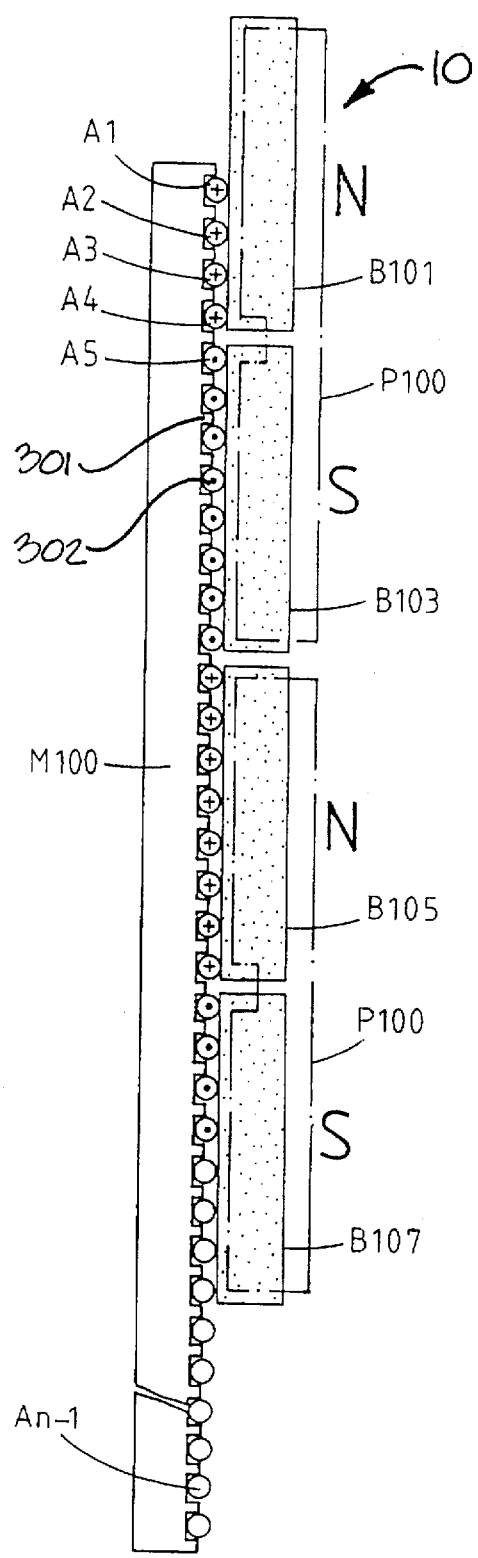
FIG. 3B is a cross-sectional view of FIG. 1, taken along lines Y—Y, illustrating a primary core.
Figure 4A:
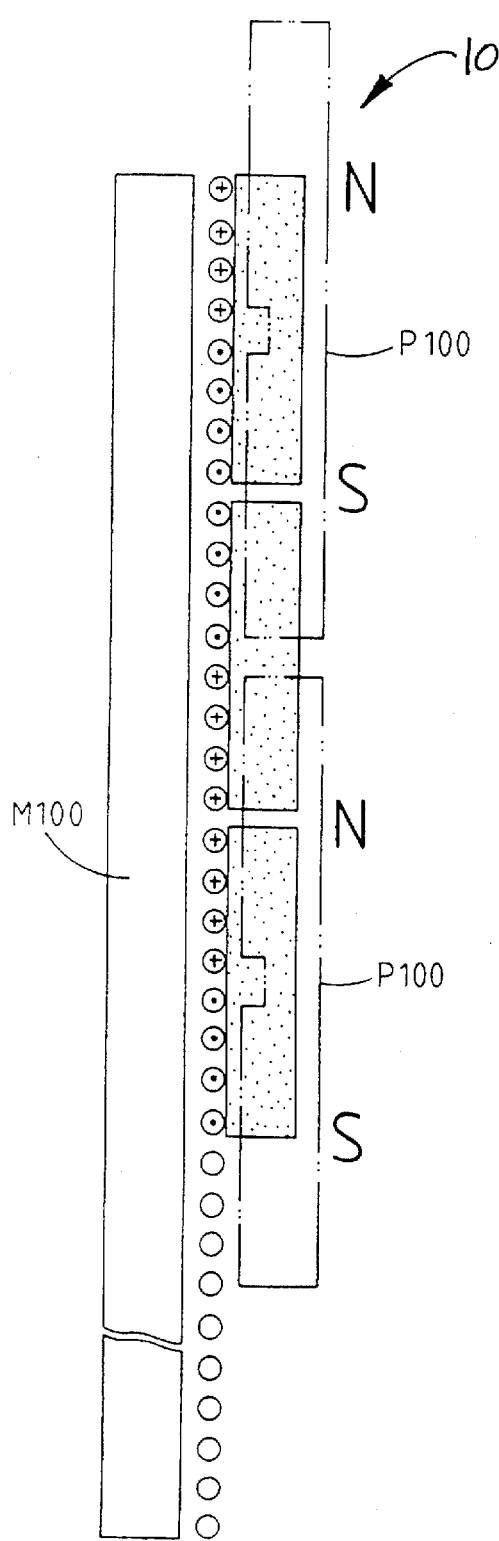
FIG. 4A is a cross-sectional view of FIG. 1, taken along lines X—X, illustrating another implementation of the primary core.
Figure 4B:
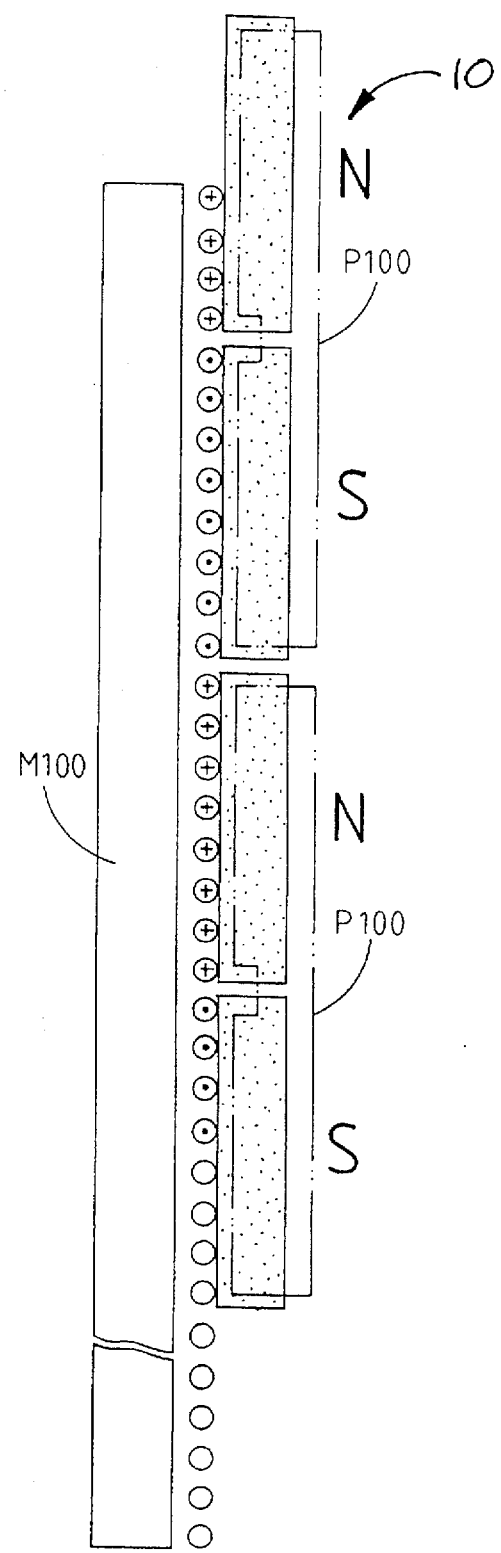
FIG. 4B is a cross-sectional view of FIG. 1, taken along lines Y—Y, illustrating the primary core of FIG. 4A.

FIG. 1 illustrates a linear DC motor in accordance with a parallelly-connected embodiment of the present invention. FIG. 2 illustrates a linear DC motor in accordance with a series-connected embodiment. In both of the embodiments shown in FIGS. 1 and 2, the DC motor of the present invention includes a primary along which a plurality of conductive segments A1, A2 . . . An-1, An are arranged side-by-side. Conductive segments A1, A2 . . . An-1, An are preferably mounted on a primary core (schematically shown in FIGS. 3A–5B), and may be embedded in respective slots in the primary core. It is a primary advantage that the number of conductive segments and the length of the primary core are not limited, and may be conveniently extended to suit any particular application. This feature is especially suited for a linear induction motor (LIM) in which an extendable length is crucial. The right and left ends of conductive segments A1, A2 . . . An are provided with a corresponding pair of commutating pads CL1&CR1, CL2&CR . . . CLn-2&CRn-2, CLn-1&CRn-2, CLn&CRn, respectively. Commutating pads CL1–CRn may be integrally formed extensions of conductive segments A1–An. These commutating pads CL1–CRn are formed by means known by those skilled in the art.

The DC motor of FIGS. 1 and 2 also includes a secondary 10 adapted for electromotive movement with respect to the primary. The secondary 10 has at least one (but preferably more than one) magnetic poles P100 directed orthogonally to the primary conductive segments A1, A2 . . . An. The magnetic poles are arranged in alternating polarities (N-S-N-S) as shown.

The DC motor also includes a commutator for commutating the conductive segments A1, A2 . . . An of the primary to maintain a linear induction drive of the secondary 10 as the secondary 10 moves along the length of the primary. The commutator comprises a plurality of commutating strips B101, B102 . . . B107 mounted on opposing sides of the secondary 10. The commutating strips B101, B103 . . . B107 on the right side of the secondary 10 maintain slidable conductive contact with a respective cluster of commutating pads on the same side. Likewise, the commutating strips B102, B104 . . . B106 on the left side of the secondary 10 maintain slidable conductive contact with a respective cluster of commutating pads on the left side. As, for example, in the instant shown in FIG. 1, the commutating strip B01 is in contact with the cluster of the commutating pads $CR_1$–$CR_4$; while the commutating strip B102 is in contact with the cluster of the commutating pads CL1–CL4 and the left commutating pads of the conductive segments A5–A9. As soon as excitation current is supplied to the commutating strips, the current flows from the input source through the commutating strip and through the respective cluster of the commutating pads to the respective conductive segments. The current flowing along the conductive segments, creates a magnetic field which reacts with the magnetic flux of the respective magnet of the secondary, and this reaction creates a force driving the secondary in respect to the primary (to be discussed below in detail). When the secondary moves, the commutating strips move along with the secondary and slide on the commutating pads of the conductive segments. If, for instance, in reference to FIG. 1 (and as discussed below), the secondary moves in the direction from the conductive segment A1 towards the conductive segment An, the commutating strip B101 will engage, in sequence, the conductive segments A1–A5, A1–A6, A1–A7, A1–A8, A2–A9, A3–A10, etc. Similarly, the commutating strip B102 will engage, in sequence, the conductive segments A2–A9, A3–A10, etc. It will be readily understood by those skilled in the art, that in the conductive segments coming into contact with or leaving the respective commutating strip which supplies the excitation current thereto, the current flow changes its direction such that the secondary is kept being propelled in the required direction as discussed in detail below in reference to FIGS. 1A and 1B.

In FIG. 1, commutating strips B102, B104 . . . B106 on the left side extend between points midway of the left sides of the magnets of secondary 10 and are spaced by a gap between each pair of commutating strips which should not be less than the width of one commutating pad CL1 . . . CLn. The commutating strips B101, B103 . . . B105, B107 on the right side are coextensive with the right side of the magnets of secondary 10 and are spaced by a gap between each pair of commutating strips which should not be less than the width of one commutating pad CR1 . . . CRn. The commutating strips B101 . . . B107 are equally spaced on both sides of the secondary 10 along the length, and the commutating strips B102, B104, B106 on the left side are arranged 180° out of phase with the commutating strips B101, B103, B105, B107 on the right side. In other words, each left side commutating strip B102, B104 . . . B106 makes contact with a cluster of conductive segments A1 . . . An via left commutating pads CL1 . . . CLn, while each side commutating strip B101, B103 . . . B105, B107 makes contact with a cluster of conductive segments A1 . . . An via right commutating pads CR1 . . . CRn. As shown, half of the adjacent conductive segments contacting a commutating strip on one side of the secondary are also contacting one commutating strip on the other side of the secondary, while half are contacting another adjacent commutating strip on the other side of the secondary. As a specific example, a cluster of adjacent conductive segments A1–A4 are connected between commutating strips B101 and B102, while another cluster of adjacent segments A5–A8 are connected between commutating strips B102 and B103. The arrangement continues in this manner for all commutating strips along the length of secondary 10, and for all conductive segments along the length of the primary. It will be appreciated by those skilled in the art that right and left sides of the secondary, right and left commutating strips, etc. can be interchanged from right to left without affecting the operability of the invention. Therefore, those elements can be referred to as "one" side and "opposite" side, or "first commutating strips" and "second commutating strips", etc.

Given the above-described arrangement, power can be applied to the commutating strips B101–B107 and the conductive segments will serve as excitation coils for driving the primary.

The embodiment of FIG. 1 is a parallelly-connected embodiment in which alternate right side commutating strips, for example commutating strips B101 and B105, are connected to a source input of one polarity (+) while the other right side commutating strips B103 and B107 are connected to the other polarity (−). It will be appreciated by those skilled in the art that (+) and (−) terminals and conductors for the application of DC potential to the respective commutating strips constitute means for applying a DC potential of positive or negative polarity to the commutating strips. The parallel-connected embodiment engenders multiple parallel current paths from each right side commutating strip B101, B103 ... B105, B107 to a left side commutating strip B102, B104 ... B106 and back to an adjacent right side commutating strip. In the parallelly-connected embodiment of FIG. 1, the extent of each secondary magnetic pole must equal the extent of one commutating strip B101–B107 (180 electrical degrees in the illustrated embodiment). As shown in FIG. 1, current return paths from the positive terminal (+) of the input source to the negative terminal (−) are provided by commutating strips B102, B103 etc. Current from the positive terminal flows from B101 through conductive segments A1–A4 into B102, thence through conductive segments A5–A8 into B103, whence it returns to the negative terminal.

FIG. 1A is an elevation view of the present invention corresponding to FIG. 1 except that the position of commutating strips B102, B104 and B106 is modified for clarity. In FIG. 1A, commutating strips B102, B104, and B106 are shown as contacting the under sides of conductive segments A1, A2, etc., where, in practice, all commutating strips B101–B107 would contact the upper surfaces of conductive segments A1, A2, etc. No core for the primary is shown in FIG. 1A. The flux paths between adjacent magnetic poles of the secondary 10 are through the air. For example, flux from the north pole N1 of the magnet M1 at the left end of secondary 10 threads downward past conductive segments A1–A4 and then loops upward to enter the south pole S2 of the adjacent magnet M2, as shown by the flux lines C. Flux from magnet M1 entering magnet M2 is returned from magnet M2 to magnet M1 as is shown by the flux lines D.

In FIG. 1A, current in conductive segments A1–A4 is shown as flowing out of the plane of the paper, (i.e., from B101 to B102 in FIG. 1) and current in conductive segments A5–A12 is shown as flowing into the plane of the paper (from B102 and B104 through A5–A12 into B103). The magnetic fields surrounding conductive segments A1–A4 due to current flow are in counter clockwise direction and the field from magnet M1 to magnet M2 is also in the counter clockwise direction. Therefore, the field to the left of conductive segments A–A4 is strengthened and the field to the right of conductive segments A–A4 is weakened, generating a force on the secondary 10 that is directed to the right. The fields surrounding conductive segments A5–A12 due to current flow are in the clockwise direction. The fields of conductive segments A5–A8 due to current flow react with the flux entering magnet M2 from magnet M1 such that the fields to the right of conductive segments A5–A8 are weakened while the fields to the left of conductive segments A5–A8 are strengthened. The fields surrounding conductive segments A9–A12 due to current flow react with the flux entering magnet M2 from magnet M3 in the same manner as occurs with the fields of conductive segments A5–A8 and the flux from magnet M1, with the result that conductive segments A5–A12 also generate a force on secondary 10 that is directed to the right.

FIG. 1B shows the disposition of the fields of the secondary 10 and of the conductors A1–An of the primary after movement of the secondary 10 to the right from the position shown in FIG. 1A. In FIG. 1B, different conductive segments underlie the magnets of the secondary 10 and the directions of the currents in certain of the conductive segments is reversed, but the directions of the fields of the conductive segments of the primary and the magnets of the secondary are the same in FIG. 1B as in FIG. 1A. Therefore, the secondary will continue to be driven toward the right.

FIG. 2 is an alternative series-connected embodiment wherein the extent of each secondary pole P100 equals one-half the extent of each secondary pole P100 of FIG. 1. Commutating strips B201 and B207 at opposite ends of the left side of secondary 10 are coextensive with the left sides of the poles at the opposite ends of the secondary 10. Commutating strips B202, B204, and B206 on the right side of the secondary 10 and commutating strips B203 and B205 on the left side of the secondary each extend the lengths of two adjacent poles of the secondary. In the embodiment of FIG. 2, any commutating strip on either side may be connected to any other commutating strip on the same side to complete a zig-zag series current path back and forth across the clusters of conductive segments A1–An, thereby serving to drive the primary. For example, if an input source of one polarity (+) is applied as shown to commutating strip B201, and an input source of another polarity (−) is applied to commutating strip B207, a zig-zag series current path will be created from commutating strip B201 across conductive segments A1–A4 to commutating strip B202, then back across conductive segments A5–A8 to commutating strip B203, and so on to commutating strip B207.

In either of the above-described embodiments of FIGS. 1 and 2, as the secondary 10 continues to move along the primary, successive conductive segments A1–An come into contact with each commutating strip B101–B107 (B201–B207) while departing conductive segments lose contact, but the circuitous electrical excitation paths are always maintained through successive conductive segments, and the secondary is continuously driven along the primary.

In both of the above parallel and series connected linear DC motor embodiments of FIGS. 1 and 2, the commutating angle is adjustable from a lagging angle to a leading angle by altering the dimensions and/or spacing of the commutating strips B101–B107 (B201–B208) or conductive segments A1–An, or the input source or secondary pole polarities.

In addition, these leading or lagging angle adjustments can be utilized to adjust the magnetomotive force between the primary and secondary. Therefore, the present invention is especially suitable to be used as the driving motor of a high speed electric train.

It will be appreciated by those skilled in the art that the above-described invention may be employed as a generator without altering the basic structure, and such use is considered to be within the scope of the invention.

Figure 5A:
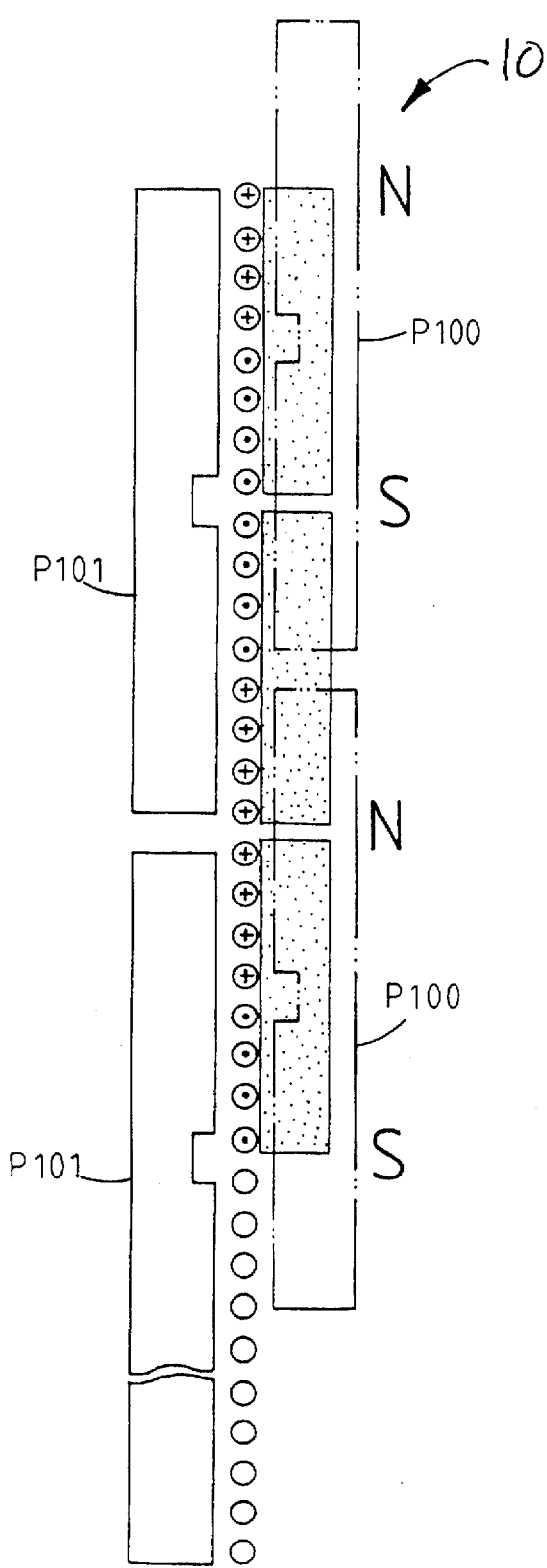
FIG. 5A is a cross-sectional view of FIG. 1, taken along lines X—X, illustrating a primary core including magnetic poles in opposite polarity.
Figure 5B:
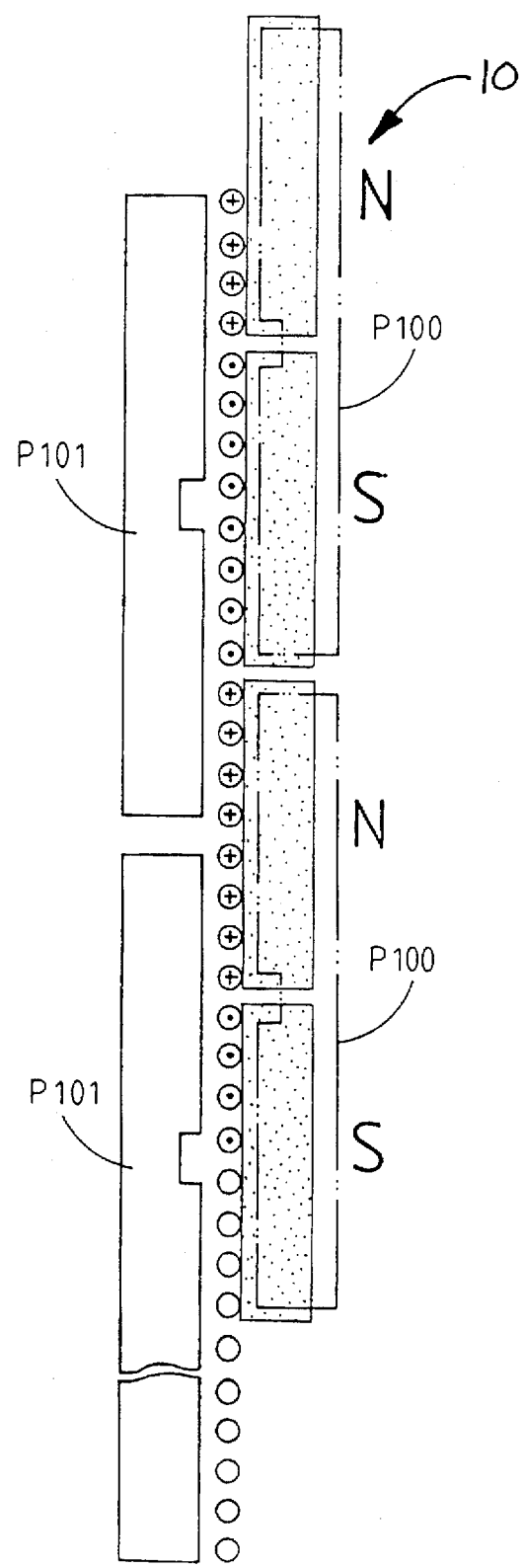
FIG. 5B is a cross-sectional view of FIG. 1, taken along lines Y—Y, illustrating the primary core of FIG. 5A.

Referring to FIGS. 3A, 3B, 4A, 4B, 5A, 5B, the DC motor of the present invention includes magnetic poles P100 and correspondingly installed primary core M100 to constitute a closed magnetic circuit accommodating the conducting segments A1–An therebetween. Said primary core M100 may be implemented with multiple teeth type iron cores 301 having respective slots 302 between each two teeth iron cores 301 to receive respective conductive segments A1–An therein (FIGS. 3A, 3B), or with a plane type coupling surface under the bottom side of the conducting segments (opposing to the side facing the magnetic poles P100 (FIGS. 4A, 4B), or with magnetic poles P101 of the opposite polarity with respect to the magnetic poles P100 (FIG. 5A, 5B). Conductive segments A1–An are installed on the primary core (in any one of its implementations) by means known by those skilled in the art. A typical flux path (as explained above in reference to FIGS. 1A, 1B) is from a north pole of the secondary 10 across the air gap separating the primary from the secondary 10, through the primary core M100 to an area underlying the adjacent south pole of the secondary 10, across the air gap between the primary and secondary, into the south pole of the adjacent magnet. From there, the magnetic circuit would be completed through air. If no core were provided for the primary, the magnetic circuits between adjacent magnets would be completely through air.

It will be appreciated by those skilled in the art, that conductive segments may be implemented as linear segments substantially parallel to magnetic poles surface. Said conducting segments intersect with the motion direction at 90° angle (slightly larger or smaller angles). Said conducting segments may be implemented in different shapes (for instance, V shape) to reduce the thrust pulsation. In order to meet various requirements in different applications of the present invention, the coupling surface between conductive segments and magnetic poles may be implemented (in cross-sectional view) in linear, in V shape, U shape, W shape, M shape, and other modifications.

It will also be appreciated by those skilled in the art that the basic concept of the present invention may be incorporated in a rotary motor (of an axial type or radial type).

Figure 6:
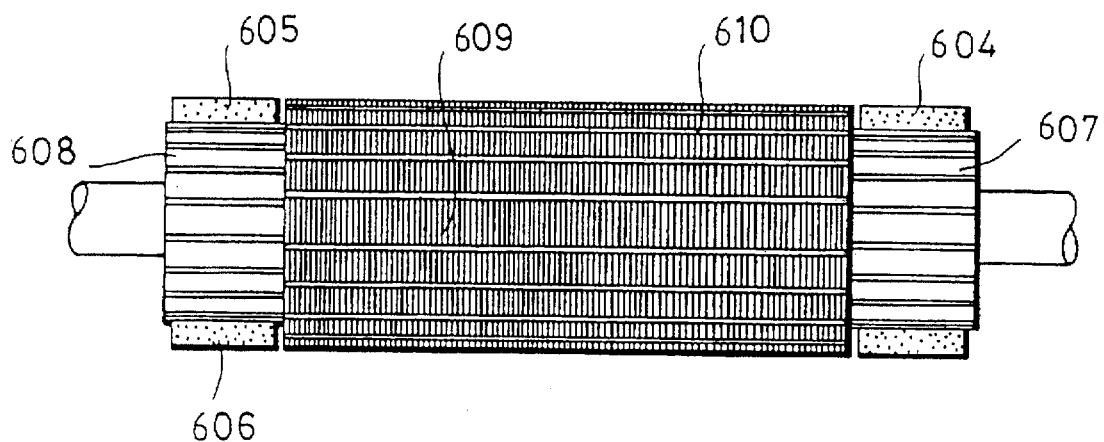
FIG. 6 is a front view of a DC motor of the present invention adapted for use in a rotary type DC motor.
Figure 7:
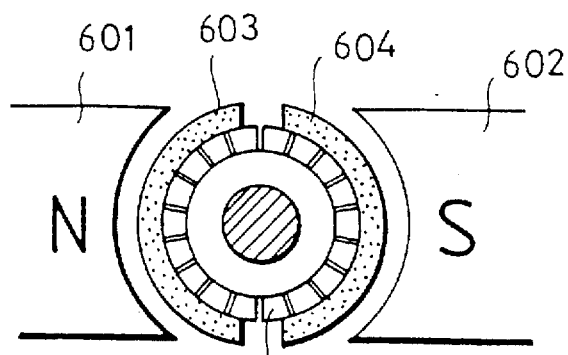
FIG. 7 is a cross-sectional view from the right side of the rotary DC embodiment shown in FIG. 6.
Figure 8:
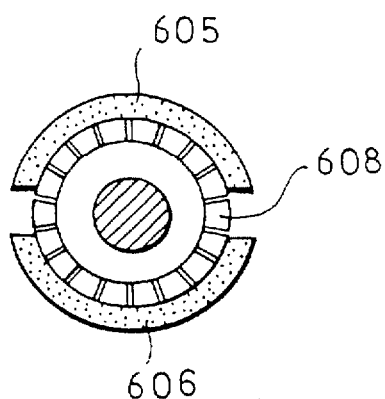
FIG. 8 is a cross-sectional view from the left side of FIG. 6.

Furthermore, another embodiment of the present invention can be incorporated in a rotary DC machine (either axial or radial) using the parallelly connected armature windings of FIG. 1. FIGS. 6, 7, 8 show an example of the present invention as it applies to a DC rotary motor. From these figures it can be seen that the cylindrical rotor is provided with evenly distributed armature windings 610, and the two ends of these windings are connected to their respective commutating segments 607, 608. A first commutator is provided at one end of the machine and has at least two commutating strips 603, 604 (one for positive power and the other for negative), the commutating strips being separated by an angle of less than 180°. The angular distance between the two commutating strips 603 and 604 should be greater than one commutating segment 607 and 608 to prevent the windings from short circuiting. A second commutator is provided at the other end of the machine and has at least two commutating strips 605, 606 (one for positive power and the other for negative), the commutating strips being separated by an angle of less than 180°. Again, the angular distance between the two commutating strips 605 and 606 should be greater than one commutating segment 607 and 608 to prevent the windings from short circuiting. The commutating strips 605 and 606 of the second commutator should be located 90° out of phase with the commutating strips 603 and 604 of the first commutator.

It will be appreciated by those skilled in the art, that the rotor may be of cylindrical, disk or cone type.

Figure 9:
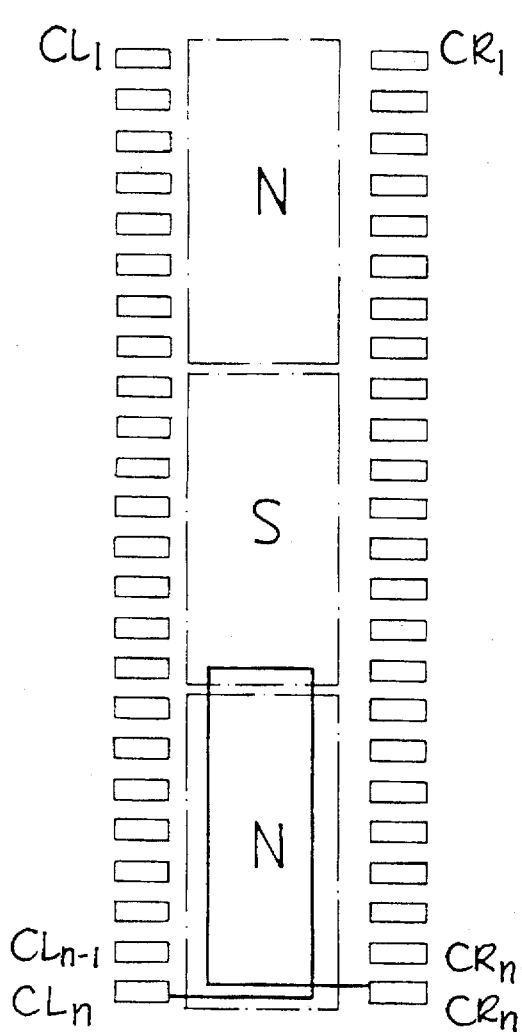
FIG. 9 shows schematically a single coil as a conductive segment in the DC motor of the present invention.
Figure 10:
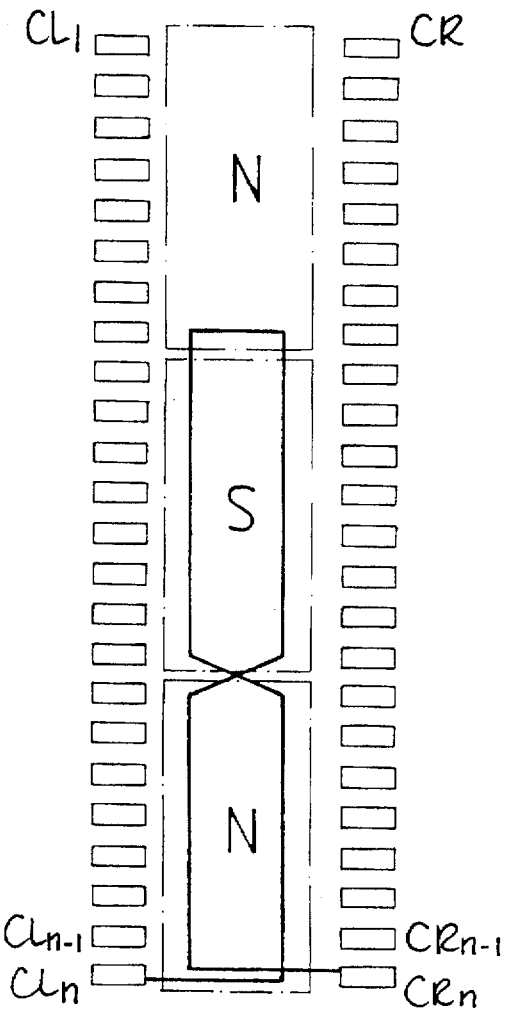
FIG. 10 shows schematically inter-crossed coils as conductive segments in the DC motor of the present invention.

It will also be appreciated by those skilled in the art that in various applications of the DC motor of the present invention, the conducting segments of the primary may be implemented as one (or multiple) turn one or plurality of coils, keeping however principle of two spaced-apart ends of said conducting segments. FIGS. 9 and 10 schematically show an example of a single coil and intercrossed coils, respectively. Spaced-apart ends of the coils are connected to the respective commutative pads CLn and CRn.

As it will be appreciated by those skilled in the art, when the excitation current is supplied to the primary coils via the commutative pads, the coils will interact with the magnetic poles of the secondary to thereby drive the secondary along the primary in compliance with the principles of the present invention, as discussed above. A plurality of these one loop coils (having one turn or multiple turns), best shown in page 9, and a plurality of these multi-loop coils (having one turn of inter-crossed loops or multiple turns), best shown in FIG. 10, are lap (or wave) wound to form the primary winding.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A DC motor, comprising:

a primary having a plurality of conductive segments of uniform length, each of said conductive segments having a first end portion, a medial portion, and a second end portion at the end of said conductive segment opposite said first end portion, said conductive segments being arranged side-by-side, evenly spaced apart, with said first end portions aligned along a first edge of said primary and said second end portions aligned along a second edge of said primary opposite said first edge, a secondary having a linearly disposed series magnetic poles of alternate polarity, said magnetic poles being generally rectangular in plan with uniform lengths and widths and being supported in facing relationship to said primary, with the widths of said poles extending along medial portions of said conductive segments and the lengths of said poles extending transversely to said conductive segments, commutating means on said secondary including a plurality of first and second conductive commutating strips, said first and second commutating strips each having a length substantially equal to the length of one of said magnetic poles, said first commutating strips each being disposed along one side of one of said magnetic poles and fixed with respect thereto, said first commutating strips extending parallel to said first edge of said primary substantially coextensively with said one side of said one magnetic pole so to contact simultaneously said first end portions of the ones of said conductive segments underlying a respective one of said first commutating strips, said second commutating strips each being disposed along the side of said poles opposite said one side of said poles and fixed with respect thereto, said second commutating strips extending parallel to said second edge of said primary substantially from the midpoint of said opposite side of one of said magnetic poles to the midpoint of said opposite side of the next adjacent one of said magnetic poles so as to contact simultaneously said second end portions of the ones of said conductive segments underlying a respective one of said second commutating strips; and means for applying a DC potential of alternate positive and negative polarities to successive ones of said first commutating strips such that currents will flow from said first commutating strips to said second commutating strips through respective ones of said conductive segments whose end portions contact said first and second commutating strips, said currents always flowing, as a result of the commutating strips being fixed with respect to said magnetic poles, through the respective ones of said conductive segments in a direction which causes the resulting magnetic field to have a same polarity as magnetic fields generated by said magnetic poles and therefore repel said magnetic poles, whereby said secondary is propelled by electromagnetic forces along said primary.

2. The DC motor of claim 1, wherein said magnetic poles are disposed above said primary.

3. The DC motor of claim 1, wherein said conductive segments have a linear shape.

4. A DC motor, comprising:

a primary having a plurality of conductive segments of uniform length, each of said conductive segments having a first end portion, a medial portion, and a second end portion at the end of said conductive segment opposite said first end portion, said conductive segments being arranged side-by-side, evenly spaced apart, with said first end portions aligned along a first edge of said primary and said second end portions aligned along a second edge of said primary opposite said first edge, a secondary having a linearly disposed series magnetic poles of alternate polarity, said magnetic poles being generally rectangular in plan with uniform lengths and widths and being supported in facing relationship to said primary, with the widths of said poles extending along medial portions of said conductive segments and the lengths of said poles extending transversely to said conductive segments, commutating means on said secondary including a plurality of first, second, and third conductive commutating strips, said first and second commutating strips each having a length substantially equal to twice a length of one of said magnetic poles, said third commutating strips each having a length substantially equal to the length of one of said magnetic poles, said first commutating strips each being disposed along one side of one of said magnetic poles and fixed with respect thereto, said first commutating strips extending parallel to said first edge of said primary substantially coextensively with the lengths of two adjacent ones of said magnetic poles so to contact simultaneously said first end portions of the ones of said conductive segments underlying a respective one of said first commutating strips, said second and third commutating strips each being disposed along the side of said poles opposite said one side of said poles and fixed with respect thereto, said second commutating strips extending parallel to said second edge of said primary, a first one of said third commutating strips extending substantially along the length of the first one of said magnetic poles of said series of magnetic poles so as to contact simultaneously said second end portions of the ones of said conductive segments underlying said first one of said third commutating strips, said second commutating strips each extending substantially along the lengths of an adjacent pair of said magnetic poles succeeding said first one of said magnetic poles of said series of magnetic poles so as each to contact simultaneously said second end portions of the ones of said conductive segments underlying each of said second commutating strips, a second one of said third commutating strips extending substantially along the length of the last one of said magnetic poles of said series magnetic poles so as to contact simultaneously said second end portions of the ones of said conductive segments underlying said second one of said third commutating strips; and means for applying a DC potential of one polarity to said first one of said third commutating strips and of opposite polarity to said second one of said third commutating strips such that currents will flow from said first one of said third commutating strips to said second one of said third commutating strips through respective ones of said conductive segments whose end portions contact said first one of said third commutating strips and one of said first commutating strips, said one of said first commutating strips and one of said second commutating strips, and said one of said second commutating strips and said second one of said third commutating strips, said currents always flowing, as a result of the commutating strips being fixed with respect to said magnetic poles, through the respective ones of said conductive segments in a direction which causes the resulting magnetic field to have a same polarity as magnetic fields generated by adjacent magnetic poles and therefore repel said adjacent magnetic poles, whereby said secondary is propelled by electromagnetic forces along said primary.

5. The DC motor of claim 4, wherein said conductive segments have a linear shape.

6. The DC of motor claim 4, wherein said motor is a linear motor.

7. The DC motor of claim 4, wherein the primary further includes a primary core underlying said conductive segments.

8. The DC motor of claim 7, wherein said primary core has a plurality of teeth cores.

9. The DC motor of claim 7, wherein said primary core includes a plane coupling surface.

10. The DC motor of claim 7, wherein said primary core includes primary magnetic poles having a polarity opposite to the polarity of the magnetic poles of the secondary.

11. A DC motor, comprising:

a primary having a plurality of coils, each said coil having a first end portion, a medial portion and a second end portion spaced from the first end portion, said coils being wound with said first end portions aligned along a first edge of said primary and said second end portions aligned along a second edge of said primary opposite said first edge, a secondary having a linearly disposed series magnetic poles of alternate polarity, said magnetic poles being supported in facing relationship to said primary, commutating means including a plurality of first and second conductive commutating strips, said first and second commutating strips each having a length substantially equal to the length of one of said magnetic poles, said first commutating strips each being disposed along one side of one of said magnetic poles and extending parallel to said first edge of said primary substantially coextensively with said one side of said one magnetic pole so as to contact simultaneously said first end portions of the ones of said coils underlying said first commutating strip, said second commutating strips each being disposed along the side of said poles opposite said one side of said poles and extending parallel to said second edge of said primary substantially from the midpoint of said opposite side of one of said magnetic poles to the midpoint of said opposite side of the next adjacent one of said magnetic poles so as to contact simultaneously said second end portions of the ones of said coils underlying said second cummutating strip; and means for applying a DC potential of alternate positive and negative polarities to successive ones of said first commutating strips;

whereby said secondary is propelled by electromagnetic forces along said primary.

12. The DC motor of claim 11, wherein said medial portion of the coil includes one turn one loop coil.

13. The DC motor of claim 11, wherein said medial portions of the coil includes at least two inter-crossing loops.

14. The DC motor of claim 13, wherein said medial portion includes one turn.

15. The DC motor of claim 13, wherein said medial portion includes a plurality of turns.

* * * * *